United States Patent [19]

Beaurain

[11] 3,921,367
[45] Nov. 25, 1975

[54] PROCESS FOR CONDITIONING LIQUID
[76] Inventor: Francis Beaurain, Route Nationale, Boubert S/Canche, 62 270 Frevent, France
[22] Filed: Oct. 11, 1973
[21] Appl. No.: 405,424

[52] U.S. Cl. ............................ 53/37; 53/30; 53/167; 53/184; 53/266
[51] Int. Cl. ........................... B65b 3/02; B65b 3/06
[58] Field of Search ............ 53/28, 29, 30, 37, 180, 53/184, 266, 281, 282, 167

[56] References Cited
UNITED STATES PATENTS

| | | | |
|---|---|---|---|
| 2,759,308 | 8/1956 | Nawrocki | 53/180 X |
| 2,885,848 | 5/1959 | Brien et al. | 53/180 |
| 3,057,129 | 10/1962 | Meissner | 53/28 |
| 3,355,854 | 12/1967 | Lowry | 53/28 |
| 3,366,523 | 1/1968 | Weber | 53/180 X |
| 3,466,850 | 9/1969 | Hudson et al. | 53/28 |
| 3,533,215 | 10/1970 | Ollier | 53/282 X |
| 3,726,058 | 4/1973 | Stark | 53/29 |

FOREIGN PATENTS OR APPLICATIONS
675,073  7/1953  United Kingdom ................... 53/180

*Primary Examiner*—Robert L. Spruill
*Attorney, Agent, or Firm*—Robert E. Burns; Emmanuel J. Lobato; Bruce L. Adams

[57] ABSTRACT

A method of packaging liquid-base products in a condition free of access to air, and apparatus for this purpose.

A band of receptacles is provided with a cover by attaching the latter to the band by its two longitudinal edges in order to define a sealed tunnel accessible via a transversal gap between the band and the cover. A conduit is introduced into the tunnel via the gap in order to feed in the liquid to be conditioned while the tunnel is moved, and effectively raised, in relation to the conduit. When the tunnel has reached an effectively raised position, transversal zones between the receptacles are sealed to the cover.

13 Claims, 7 Drawing Figures

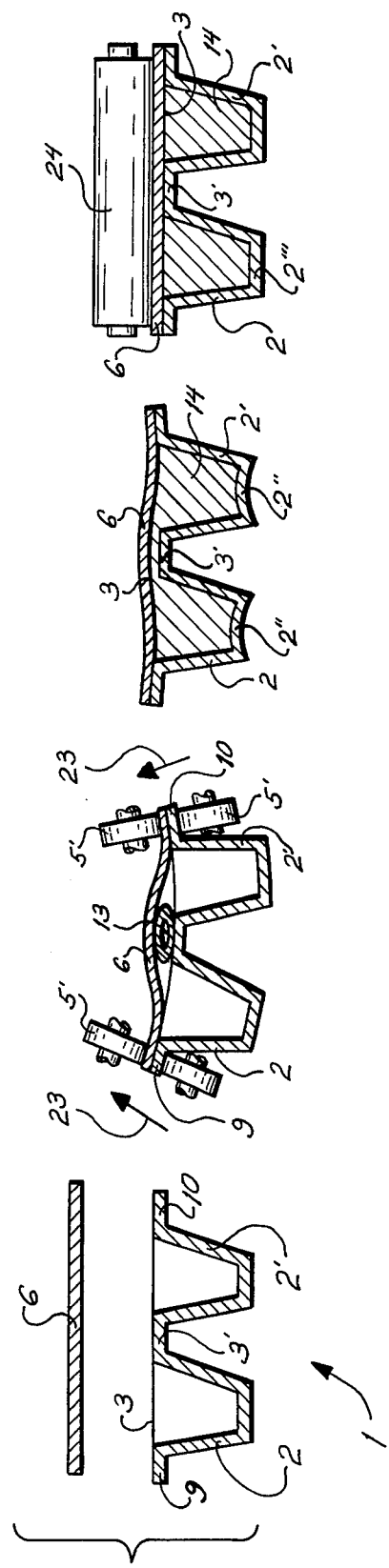

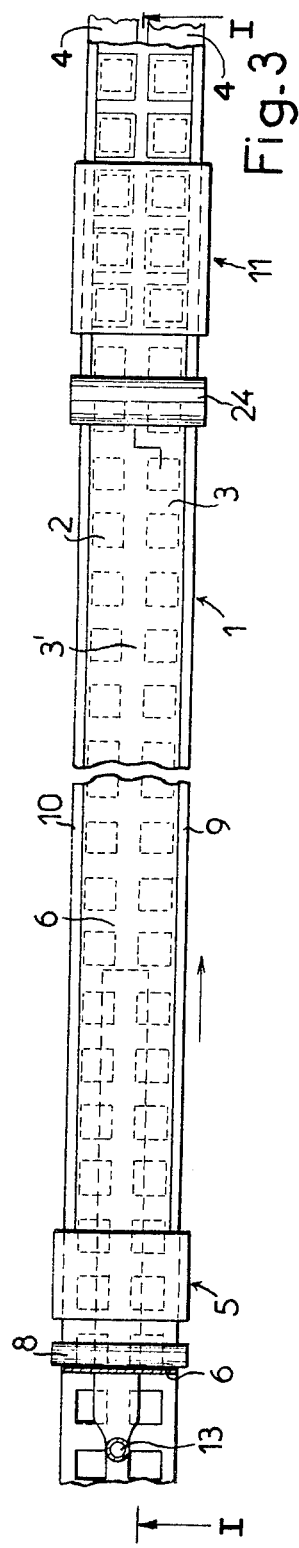
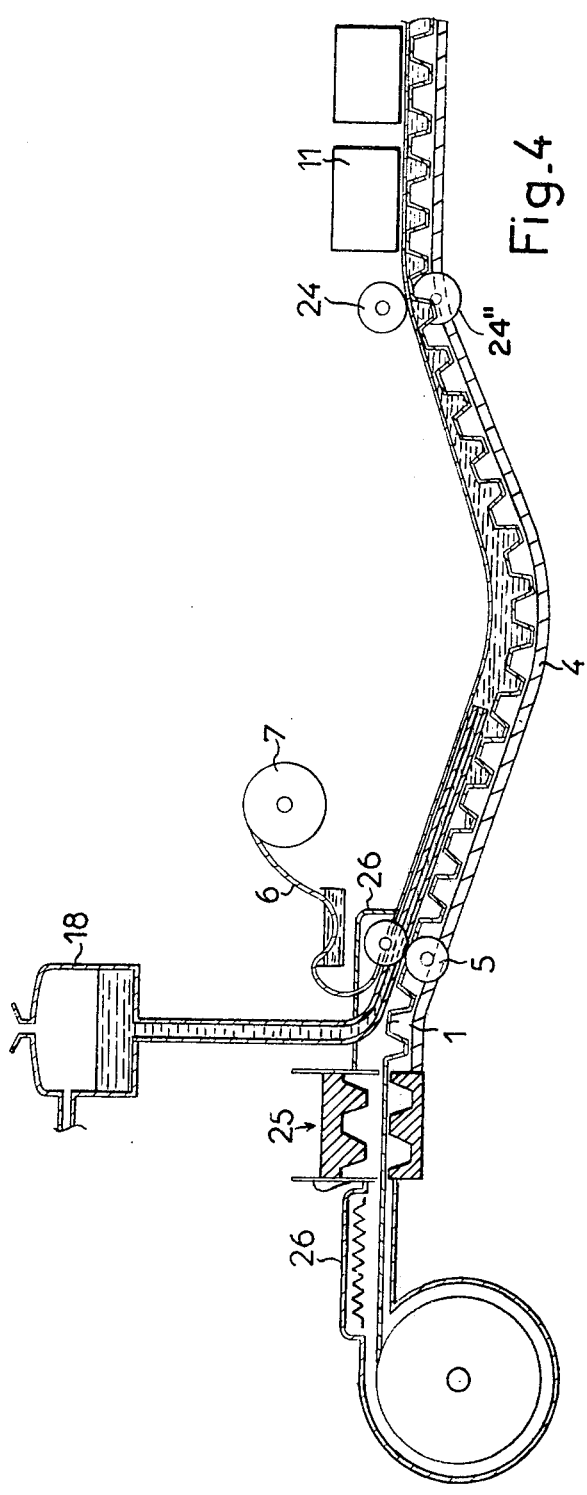

PROCESS FOR CONDITIONING LIQUID

BACKGROUND OF THE INVENTION

This invention relates to a new method of packaging liquid-based products and also to a device for this purpose.

The products to be conditioned, for which the process covered by the invention is intended, will be either completely liquid, and of low viscosity, to enable them to be poured, or partly liquid and supplemented by solids. Examples of such products are foodstuffs, such as nongaseous liquids, milk or soft drinks, or solid products to be conserved in a juice or sauce, such as the usual vegetable or fish conserves.

It has been usual to place such products in receptacles temporarily interconnected to form a longitudinal band. One such type of known band at present used in numerous industries consists of a set of receptacles shaped by a thermal process and connected together by zones which are transversal to the band and in which incisions are made to enable the receptacles to be separated from one another after they have been filled.

In such packaging it is at present necessary for the product to be apportioned volumetrically, if liquid, or in weight, if solid.

In the conditioning of dairy products such as frozen milk or yoghurt, the band of thermally shaped pots circulates under apportioning devices by which the product is distributed into the open pots. When these latter have been filled they are provided with their covers, e.g. by sealing onto them covers of metal or plastic foil. The operation of filling the pots by apportioning devices makes it necessary for the movement of the band to be momentarily stopped while the respective pots are in position underneath the apportioning nozzle. This known process thus greatly reduces the conditioning output. The output rates are at all events subject to limits for the speed allowed to transfer the filled but still uncovered containers in a manner which avoids all risk of soiling the transversal zones interconnecting the pots, as these zones are eventually to be heat-sealed to the cover.

The known process likewise does not make it possible to fill the container right up to the edge. This is a serious drawback, as it leads to the presence of gas between the product and the cover once the receptacle has been closed. This gas naturally detracts from the conservation of the product by causing it to dry up or to undergo oxidation, exudation etc.

SUMMARY OF THE INVENTION

The conditioning process to which the invention relates remedies these drawbacks, one of its first objects, for this purpose, being to enable a given quantity of an at least partly liquid product to be conditioned without the use of any auxiliary apportioning device, whether based on weight or on volume.

This apportioning phase being dispensed with, a further object of the process to which the invention relates is to obtain a considerable increase in the receptacle filling rates by avoiding the periodical stoppages of the band.

A further important characteristic of the process to which the invention relates is that it enables receptacles to be filled right up to the edge and thus eliminates the presence of gas, ensuring that the product will be conserved more satisfactorily. Furthermore, the rigidity and compressive strength of the containers will be greatly improved.

The process covered by the invention for placing an at least partly liquid product in receptacles temporarily interconnected in the form of a longitudinal band is characterized by the fact that a number of receptacles are provided with a cover by attaching the latter to the band by its two longitudinal edges, in order to define a seal tunnel accessible via a transversal space or gap between the band and the cover, a conduit being introduced into the said tunnel via said gap in order to feed in the liquid to be conditioned while the tunnel is moved in relation to the conduit to lower the pressure prevailing in the receptacles. Thereafter, transversal zones between the receptacles are sealed to the cover.

The device to which the invention relates is characterized by the fact that it comprises a support on which the band moves, a conduit by which the product is distributed and which is substantially parallel to the band and situated above it, means by which the cover is moved into position above the conduit, means situated upstream from the orifice of the conduit and serving to affix the cover to the two longitudinal edges of the band and means situated downstream from the conduit and effectively above the same for affixing the cover to the band in transversal zones between the receptacles.

BRIEF DESCRIPTION OF THE DRAWINGS

The invention will be understood more clearly by reference to the following description, given by way of example, of the various phases of the process and also to a non-limitative version of the device covered by the invention, illustrated schematically by the accompanying drawings, in which:

FIGS. 2A to 2D are sections taken respectively along the lines IIa—IIa to IId—IId of FIG. 1;

FIG. 3 is a view, from above, of the band shown in FIG. 1; and

FIG. 4 is a slightly modified diagram generally similar to FIG. 1, shows a more complete installation.

DESCRIPTION OF PREFERRED EMBODIMENT

Figure 1:
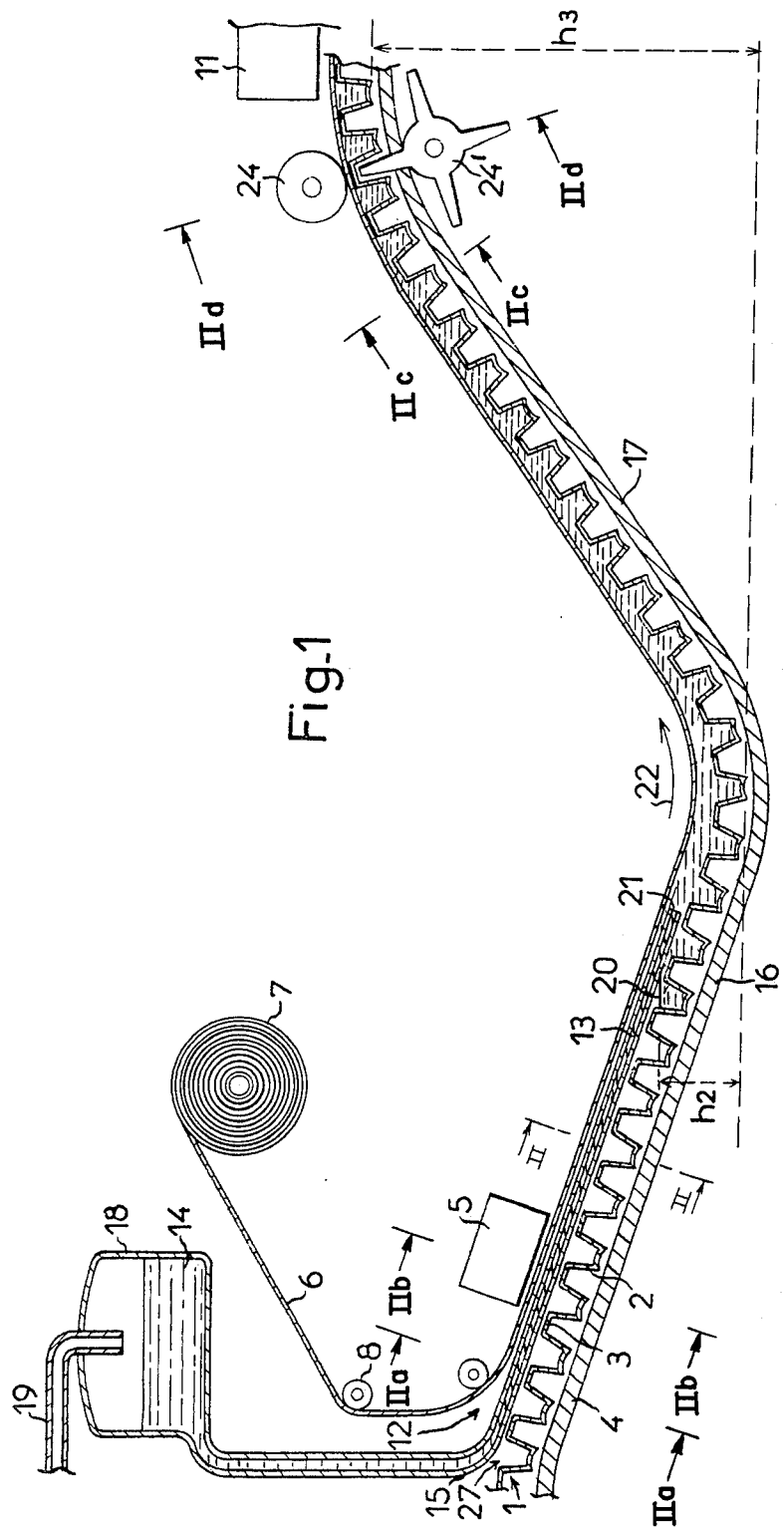
FIG. 1 is an over-all schematic view of a device according to the invention, taken along line I—I in FIG. 4.

The illustrated embodiment of the invention provides that receptacles 2, arranged as a band 1 are covered before they are filled. Complete filling of the covered receptacles with a basically liquid product 14 is effected by a distributing conduit 13 giving access to the interior of the receptacles through a space provided between the band 1 and the cover 6, which latter affixed to the band 1, first by its two longitudinal edges 9, 10 coextensive with the length of the band, and thereafter in transversal zones 3 between successive receptacles 2.

Thus a hermetic longitudinal tunnel, with a sealed outlet (at right in FIG. 1) and which is only accessible by its transversal inlet 12, is defined by the band 1 and the cover 6, after the latter has been affixed. Thereby the receptacles 2 can be totally protected from the ingress of gases, such as air, by filling them tight up to the edge.

As the bands 1 of receptacles 2 can be made of thermally shaped plastics and as the gases can be totally eliminated, plastics of considerably reduced thickness can be used and the cost of the packings therefore likewise reduced.

It is possible, when sealing the transversal zones 3, near said outlet of the funnel to compress each filled receptacle 2 to a slight extent, e.g. by adopting a more concave shape for the base. The product 14 thus conditioned, despite the fact that the receptacles 2 are completely filled, will not be split when a receptacle is opened, since the action of detaching the cover will cause the concave walls to return to their original shape, causing the receptacle to expand, thus increasing the volume of the receptacle and causing the level of the product to descend.

The system in which the required dosage of product for each receptacle is obtained by the volume of the receptacle itself, without recourse to an auxiliary apportioning device, enables the receptacles to be filled continuously and any stoppage of the band at an apportioning station to be eliminated. The rates of output are thus considerably increased. It should be noted that despite the absence of an auxiliary apportioning device the new apportioning operation is extremely accurate. It is only necessary that the receptacles of the band are of a uniform preselected volume, an object which is practically always achieved, particularly when the band is made of a thermally shaped plastic material.

As the process according to the invention enables the cover 6 to be affixed to the receptacles 2 before the latter are filled with product 14, it provides very advantageous sterile conditioning of the product. Heretofore sterilization was effected in a long sterile tunnel, on a band containing empty receptacles, with the aid of apportioning apparatus. The sterile condition had to be maintained until each receptacle was entirely sealed up. With the process and conditioning device proposed it will be sufficient for the band to be solely sterilized between the manufacturing of the band, e.g. the thermal shaping thereof, and the operation of affixing the cover to the two longitudinal edges of the band. As apportioning devices are thus eliminated they no longer have to be sterilized, and all that is required is to keep a tubular zone sterile over a small distance. In typical installations the cost of sterilization apparatus required is thus reduced by more than three-fourths.

FIGS. 1 and 3 show a longitudinal band marked 1 as a whole and consisting of receptacles 2 provisionally interconnected by zones 3 transversal to the band. Particularly, as shown in FIGS. 2A and 3, two parallel rows of receptacles 2,2' are provided, which are initially interconnected by a zone 3' longitudinal of the band. The shape of the receptacles 2, their relative positions and also the number of such containers on a given width of band are left to the decision of the manufacturer, provided that they, and the entire band 1, have continuous longitudinal edges 9, 10 and transverse edge zones 3. The material used for the band 1 consists preferably but not necessarily of thermally shaped plastic.

In the construction shown in FIG. 1 the band 1 moves on support means 4, such as an endless belt conveyor, into and through or position underneath a sealing or sticking station 5. A covering band 6, initially stored on a roll 7, likewise moves over rollers 8 into and through a position underneath the station 5, but above the band 1.

The purpose of the operating station 5 is to affix the covering band 6 to the band 1 along its two longitudinal edges 9 and 10, as may be seen from FIG. 2B. The whole of that part of the band 1 which is situated downstream from the station 5 is thus provided with the cover 6 attached thereto along the longitudinal edges 9, 10.

A second sticking or sealing station 11 is likewise provided on the path of the band, in order to affix the cover 6 to the zones 3 when the receptacles 2 have been filled. After this second sealing operation the receptacles can be separated from one another along zones 3 and 3', for example by automatic cutters, known to the art and not shown herein.

In the installation shown schematically in FIG. 1, therefore, a sealed tunnel is provided by affixing the cover 6 to the band 1 along its longitudinal edges 9 and 10 in the station 5. Thereafter the cover is also affixed to the band 1 in transversal zones 3, in the station 11. Tunnel is accessible via transversal space 12 between the band 1 and the cover 6.

A conduit 13, carrying liquid 14 from a storage vessel 18, penetrates the tunnel via the transversed space or gap 12 thus defined. This conduit may be curved, for example, at the point marked 15, according to the construction of the installation and the shape selected for the support 4.

As shown in FIGS. 1 and 4 a support 4 has two inclined slopes, the first slope 16 descending and the second slope 17 ascending in the direction of travel of band 1. It is over this descending slope 16 that the conduit 13 is introduced via the gap 12. It will be seen in FIG. 2B that the conduit has been flattened in order to facilitate insertion of the conduit. The storage vessel 18 is connected to the atmosphere via a vent pipe 19 and the conduit 13 continuously pours liquid 14 into the tunnel 1, 6 as long as the level 20 of liquid 14 collected in the tunnel is situated below discharge orifice 21 of the conduit. As soon as the liquid 20 rises above the said orifice the product ceases to flow. The band 1 may then cause the liquid level to descend by moving in the direction shown by the arrow 22. Liquid product 14 thus substantially remains at a constant level 20 in a lower part of descending slope 16, and fills all the receptacles 2 situated in the tunnel between the orifice 21 of the tube and the final sealing station 11. The air contained in these receptacles is able to escape freely through the gap 12.

The ascending part 17 of the tunnel as shown, rises to a height $h_3$ higher than the height $h_2$ of liquid level 20. Thus the ascending part 17 forms, in conjunction with part 16 a syphon enabling escape of gases from liquid product 14 through part 16 and also enabling a subatmospheric pressure P, proportional to the difference h2-h3 produced in the levels, to be established in the receptacles 2 situated at the level $h3$, just before the final sealing station 11.

If, for example, this difference produced in the levels amounts to 1 m and the product is water, $P = 0.1$ kg/cm$^2$.

If a semi-rigid thermally shaped band 1 is used, all the surfaces of the receptacles 2 then assume a slightly outward concave shape (FIG. 2C). The concavity of the weaker parts, such as the cover 6 and the base 2, will be more pronounced (FIG. 2C). This difference in level $h3$-$h2$ can be adjusted to enable the desired degree of concavity to be obtained for the containers 2.

Throughout the tunnel, between the ultimate sealing station 11 and the orifice 21, the covering band 6 can assume an upwardly convex shape, as shown in FIGS. 2B, 2C, by suitably bending the band and by the complete filling of the tunnel with incompressible liquid of product. The semi-rigidity of the materials used for band 6 will enable this deformation to take place without any difficulty. It can be controlled, if necessary, by applying a slight thrust, in the direction shown by the arrows 23 in FIG. 2, to the band 1 along its longitudinal edges 9 and 10. This thrust will also render it easier to introduce the tube 13 into the tunnel, as already noted.

The convex covering band 6 is ultimately flattened by a compression roll 24 situated just upstream of the station 11 and acting against the band, supported on lower support wheels 24' (FIG. 1). Application of such a roll to the band 1, 6 tends to reduce the outward concavity 2" and preferably to re-establish flat shapes of the receptacle bottoms 2''' (FIG. 2D). Punches 24 may also be applied against the base of each receptacle at the moment when it is heat-sealed in the station 11. (FIG. 4) The band is then divided into individual receptacles 2 each completely filled with liquid product. Remaining concavity of receptacle surfaces is removed and flat shape is reestablished as soon as the atmospheric pressure is allowed to act in the interior of a receptacle by unsealing or piercing the cover. As the internal volume of the container is thereby increased, the level of the product 14 sinks in the container 2 and there is no risk of spilling the product when the container is opened.

The installation described in connection with FIGS. 1 and 4 could naturally undergo numerous modifications. According to the type of product and its conditioning, for example, the illustrated shape of parts 16, 17 could be eliminated and a downward slope followed by a horizontal part could be adopted for the support 4 and band 1. The support 4 could also be made completely horizontal.

FIG. 4 shows a sterile installation demonstrating the measure of economy achieved as regards the material by the process covered by the invention. In known installations, as noted sterility of the entire band had to be maintained by expensive devices provided between a thermo-shaping station for forming the band and a heat-sealing station. The apportioning devices also had to be sterilized. The process to which the invention relates, in which the receptacles 2 are almost completely covered before being filled, considerably reduces the amount of sterilization equipment involved. Sterilization is needed between thermo-shaping station 25 and the first sealing station 5, but may be terminated immediately after the station 5, when the tunnel 2, 6 has been formed. The wall 26 schematically illustrates the sterilization enclosure at and downstream from the station 25. This enclosure is needed to the point where the edges of covering band 6 have been sealed to the band 1 containing the receptacles emerging from the thermo-shaping station.

Although the invention has been described in conjunction with a particular method of execution, it likewise covers all minor additions which could be made thereto by an engineer qualified in this field, as well as any modifications which may be adopted, without departing from the principle of the invention, which resides in the conditioning of a product in a band of receptacles into which they are introduced via a passage transversal to the band. For example, solid product could be introduced at 27, before introducing the liquid.

I claim:

1. A method of rapidly producing sealed packages of a liquid-based product in a condition which prevents air from contacting the product in the sealed packages, comprising:

providing an elongate, longitudinally movable band of open-top receptacles and an overlying elongate, longitudinally movable cover sheet for the same with first and second longitudinal edges of the cover sheet overlying, respectively, first and second longitudinal edges of the band of receptacles, and with transverse edges of the receptacles extending from the first to the second edges of the band;

continuously sealing the first and second longitudinal edges of the band to the respective, overlying edges of the cover sheet to provide a sealed, elongate tunnel comprising the cover sheet and the band, while keeping a transversal aperture of the tunnel open at one end thereof;

keeping a portion of the tunnel, including the receptacles in said portion, filled with a sterile, liquid-base product up to a predetermined liquid level in the tunnel by introducing such product through said aperture into the tunnel below said liquid level;

continuously rapidly longitudinally raising the sealed tunnel to a zone above said liquid level to produce a lowered pressure in the tunnel and in the filled receptacles therein; and closing the filled receptacles in the raised tunnel by sealing the cover sheet to their transversal edges;

whereby sealed packages of said product, each corresponding to one of the filled receptacles, are rapidly produced in a condition which prevents air from contacting the product in the packages.

2. A method according to claim 1 wherein said raising of the sealed tunnel is performed in an inclined direction.

3. A method according to claim 1, including; moving the sealed tunnel downwardly after introducing said product into it and before said raising of the sealed tunnel to above said liquid level.

4. A method according to claim 3 wherein said moving of the sealed tunnel downwardly is performed in an inclined direction.

5. A method according to claim 1, including; providing said band of receptacles with groups of receptacles side by side along the entire band; bending said band and cover sheet to dispose the cover sheet, between the longitudinal edges thereof, sealed to the longitudinal edges of the band, spaced from the band by a convex zone, in said portion of the tunnel; introducing said product into the tunnel through said zone; and substantially keeping said zone, as well as the receptacles, filled with said product in said portion of the tunnel.

6. A method according to claim 1, including; pressing the cover sheet against the transversal edges of the receptacles directly before said closing of the receptacles, thereby controlling the producing of a lowered pressure.

7. A method according to claim 1, including; gravitationally passing said product into the tunnel for said introducing of such product.

8. Apparatus for rapidly producing sealed packages of a sterile liquid-based product in a condition which prevents air from contacting the product in the sealed packages, comprising;

means for providing an elongate band of open-top receptacles with first and second longitudinal edges and with transverse edges, said transverse edges extending between the longitudinal edges;

means for providing a cover sheet disposed above said band and having first and second longitudinal edges overlying the respective edges of the band;

means for continuously sealing longitudinal edges on each side of such a band to respective, overlying edges of such a cover sheet to provide a sealed, elongate tunnel comprising the cover sheet and the band, while keeping a transversal aperture of the tunnel open at one end thereof;

means for keeping a portion of such a tunnel, including the receptacles therein, filled with a sterile, liquid-base product up to a predetermined liquid level in the tunnel, comprising a duct which enters the tunnel through said aperture, extends along a portion of the tunnel, and has a discharge section in the tunnel;

means for continuously, rapidly, longitudinally raising the sealed tunnel to a zone above said liquid level to produce a lowered pressure in the tunnel, including the filled receptacles therein; and means for closing the filled receptacles in the raised tunnel by sealing the cover sheet to their transversal edges;

thereby enabling rapid production, filling and sealing of the receptacles, under conditions which prevent air from contacting the product in the receptacles during and after the filling and sealing thereof.

9. Apparatus according to claim 8 wherein said duct is relatively flat and wide, to fit a relatively flat and wide space between the receptacles and the cover sheet.

10. Apparatus according to claim 8, including means for guiding the band of receptacles and the cover sheet to said discharge section, and along an ascending slope from said discharge section.

11. Apparatus according to claim 8, including a sterile enclosure including a portion of the band of receptacles and the cover sheet extending from the means for providing the band and cover sheet to the means for sealing edges thereof.

12. Apparatus according to claim 8 wherein said means for sealing edges comprises roller means for engaging said edges and for pressing them against one another.

13. Apparatus according to claim 12 wherein said means for closing comprises compression roll means for pressing the cover sheet against the transverse edges of the receptacles.

* * * * *